Feb. 27, 1945.     R. T. HOSKING     2,370,352

LOCK-NUT

Filed Feb. 4, 1943

INVENTOR
RICHARD T. HOSKING
BY
George B. Willcox.
ATTORNEY

Patented Feb. 27, 1945

2,370,352

UNITED STATES PATENT OFFICE 2,370,352

LOCK NUT

Richard T. Hosking, Wilmette, Ill., assignor to H. R. Hough Company, Chicago, Ill.

Application February 4, 1943, Serial No. 474,741

2 Claims. (Cl. 151—22)

This invention relates to improvements in lock nuts of the type wherein a tubular member extends from a face of the nut body and the extension is deformed in the region of its free end or lip sufficiently to produce so-called locking effect when the nut is screwed upon a threaded bolt.

My improvement pertains more particularly to certain new and useful structural features of the lip portion of such projecting members.

The principal objects of my invention are, to reduce as far as practicable the amount of turning force required for screwing the nut clear onto the bolt so that the bolt threads extend completely through the threaded nut from face to face. By thus reducing the required turning effect the durability of the nut is increased, making it capable of reuse a greater number of times before its locking or holding usefulness becomes impaired and to provide a device that will accomplish this result without causing undue wear of the interengaging threads of the nut and bolt.

Another object is to provide a lip structure for the tubular member wherein the threads at the ends of one diameter of the hole in the lip are of greater depth than the threads at the opposite diameter to further reduce wear on the threads when the nut is being tightened.

A further object is to attain such objects by a nut structure that can be manufactured at small cost, that shall require a minimum number of steps or operations for its production and shall be capable of being manufactured with the least amount of material.

With the foregoing and certain other objects in view, which will appear later in the specification, my invention comprises the devices described and claimed and the equivalents thereof.

Figure 2:
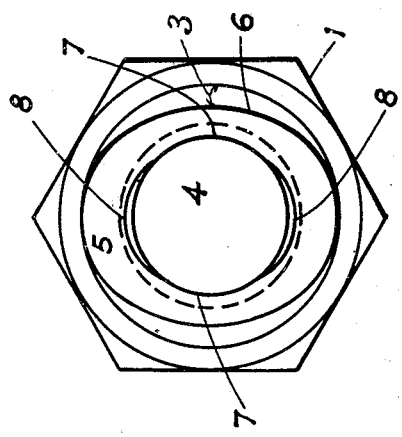
Fig. 2 is a similar view showing the nut of Fig. 1 after its lip portion has been deformed and after the nut thus deformed has been internally threaded.
Figure 3:
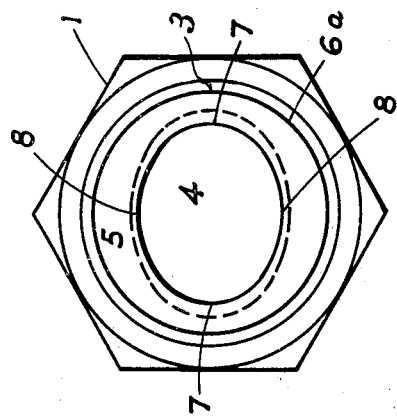
Fig. 3 shows the finished nut after the oblong lip structure of Fig. 2 has been deformed into oblong shape disposed at right angles to the position in Fig. 2.
Figure 1:
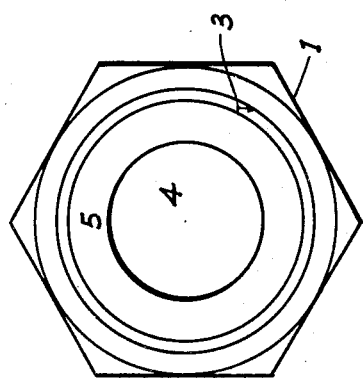
Fig. 1 is a plan view of a nut of the kind to which my invention is adapted to be applied.
Figure 5:
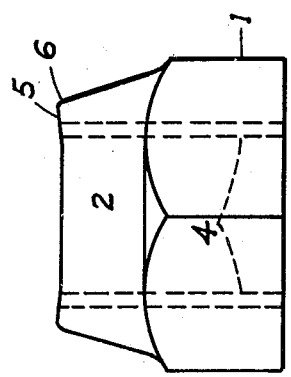
Figure 6:
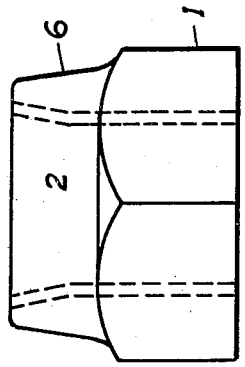
Figure 4:
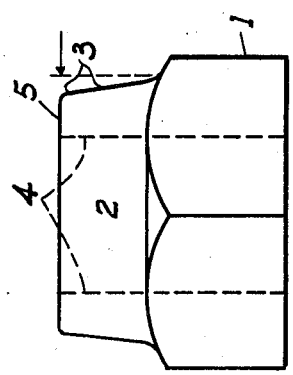

Figs. 4, 5, and 6 are side views of the parts shown respectively in Figs. 1, 2, and 3.

In the drawing, Figs. 1, 4; 2, 5; 3, 6 show a locknut in successive stages of manufacture, with certain features exaggerated for purposes of description. Figs. 3 and 6 show the completed article.

A typical embodiment of my improvement is shown, it being understood that it may be embodied in any usual or desirable type of nut without departing from the invention as set forth in the claims.

Numeral 1 designates a nut body, from the outer face of which projects a tubular extension member 2 (Fig. 2) which is of relatively smaller diameter than body 1. Preferably, the outer peripheral wall of member 2 is tapered as indicated at 3.

In Figs. 1 and 4 the body 1 and extension member 2 are formed with a cylindrical axial bore 4 common to both.

In applying my invention to a nut such as that shown in Figs. 1 and 4 I proceed as follows:

First operation, Fig. 2

The opposite walls of the free end or lip portion 5 of extension 2 are squeezed toward each other in the direction indicated by the horizontal arrows, Figs. 1 and 4, thereby shortening the horizontal diameter of the bore 4 and slightly increasing its vertical diameter as is shown in Figs. 2 and 5. The portion of bore 4 through the body of the nut 1 remains undisturbed by such deformation of lip 5 and the lower part of extension 2 remains substantially undisturbed, but the free end or lip portion 5 of the part 2 becomes slightly oblong or elliptical in contour both inside and out as is shown in Fig. 2. The outside of the lip 5 as thus deformed to oblong shape is indicated by the contour line 6 in Fig. 2, and since the thickness of the lip 5 remains uniform throughout its circular length, the contour of the inside or bore 4 of the lip 5 likewise becomes oblong.

In Fig. 2, numerals 7, 7 indicate diagrammatically the two ends of the horizontal short diameter of bore 4, Fig. 4, at the lip 5, and 8, 8 the ends of the vertical long diameter.

Second operation, Fig. 2

I then thread the nut clear through the nut body 1, extension member 2, and the oblong lip 5, using, for example, a thread tap, straight or tapered, and putting it straight through.

It will be understood that the bore 4, Figs. 1 and 4, was originally of suitable diameter for the tap. Hence the thread produced by the tap is of standard height throughout the length of the body 1 and extension 2; but in going through the squeezed-in portion of elliptical lip 5 the tap cuts deeper at 7, 7, and at 8, 8 it cuts away slightly less depth of metal. Consequently, as shown by the broken lines, Fig. 2, the threads at 7, 7 are of full height and at 8, 8 are of slightly less than full height. Consequently the threads are somewhat truncated and blunt edged at 8, 8, instead of being quite as sharp as at 7, 7. This condition is one of the desirable features of my improvement, as will be explained later.

The walls of lip portion 5 are originally of the same thickness throughout as shown in Fig. 1. But after the lip is squeezed into oblong shape the operation of tapping just described changes the character of the lip, Fig. 2. The lip thickness at 8, 8 remains unchanged by tapping, but at 7, 7, the short diameter, the tap cuts deeper into the lip 5, removing more metal from the walls of the bore 4 at the points 7, 7. That makes the solid wall portion of lip 5 somewhat thinner at 7, 7. The operating advantages of thus thinning the wall of the lip at 7, 7 will be explained further in the specifications.

The difference in the height of threads at 7, 7 and at 8, 8, Fig. 2, and the consequent sharpness and bluntness of the thread edges at those points respectively, is slight, being in some instances a matter of only a few thousandths of an inch; but, as will be set forth, those peculiarities of my structure cooperate with other features in attaining the desired objects.

Third operation, Fig. 3

After the nut has been tapped through, as shown in Fig. 2, the oblong lip portion 5 is again deformed, but in the opposite direction, as indicated by the vertical arrows, Fig. 3, so the long vertical diameter 8, 8, Fig. 2, becomes the short vertical diameter, Fig. 3, and the short horizontal diameter 7, 7, of Fig. 2, becomes the long horizontal diameter in Fig. 3. The outer elliptical wall 6 of the lip 5 in Fig. 2 is thus formed again to circular as shown by the contour lines 6a in Fig. 3.

Now the threaded bore 4 has again become slightly oblong or elliptical, its long diameter being horizontal and its short diameter vertical. The external tapered wall 6, Fig. 6, of the conical extension member 2 is thus restored to its initial conical shape, but its wall 5 at the free end of projection 2 is thinner at 7, 7 than at 8, 8, and the threads at 7, 7 are, as stated, higher and sharper pointed than those at 8, 8.

In changing the shape of lip 5 from that indicated in Fig. 2 to the shape Fig. 3 a change is also produced in the physical character of the threads in lip 5. Such change will be apparent when it is observed that the thread pitch, Figs. 2 and 5, is uniform and correctly helical throughout the length of the body 1, extension 2, and the lip 5, notwithstanding the above described differences in thread height. In the form finally assumed by lip 5, Fig. 3, the thread has been slightly distorted to an off-pitch condition where it runs beyond lip 5. When the long diameter of the lip, 8, 8, Fig. 2, was squeezed to convert it into the short diameter, Fig. 3, the threads in the body 1 and in the lower portion of extension 2 remained truly helical, but in the elliptical part 5 of the lip the threads became distorted slightly by the squeezing and their direction became somewhat serpentine instead of remaining truly helical.

When the nut has been completely formed according to my invention as shown in Figs. 3 and 6, it preferably is hardened to make it more durable and dependable under conditions of repeated use, especially if made of steel.

Having described the structure of the preferred embodiment of my invention, its mode of operation will now be described.

When the nut is being run onto a bolt in the usual way, being a spin fit, it can be easily run down until the squeezed-in portion of lip 5 nears the end of the bolt and the latter begins to force its way through the narrow opening at 8, 8, Fig. 3. There the bolt causes the lip portion 5 to spread. Since the rim of the extension member is thinner and consequently weaker at points 7, 7, when such spreading force is exerted by the bolt upon the lip 5 at 8, 8 it will force out lip 5 at 8, 8 and thereby "draw in" lip 5 at the long diameter at 7, 7.

The amount of force required and the resultant resistance of the lips 5 to unscrewing can be determined and regulated in my device by the heat treatment and also by the amount of thinning of the lips 5 at points 7, 7, Fig. 3.

It is thus seen that the thinned walls at 7, 7 enable the bolt to spring the lips 8, 8 outwardly with considerably less force and consequently with less wear on the threads than would be required if the lip 5 were left of uniform thickness throughout its circular length, as has been attempted in certain earlier constructions of nuts.

Referring now to the feature of my improvement which has to do with providing the lip 5 with internal threads that are slightly higher at 7, 7 than at 8, 8 and consequently blunter at 8, 8 than at 7, 7, it is obvious that when the bolt is screwed through the nut body 1 and between the lips 5, 5, and forces the parts 8, 8 outwardly, there exists less tendency to cause scoring and cutting action between the threads of the nuts and the threads of the bolt because of the fact that the nut threads at 8, 8 are somewhat blunt. It is at this region 8, 8 that the threads of the lip 5 are subjected to the greatest outward strain caused by the bolt. The slightly blunted threads at 8, 8 in lip 5, being of less than standard height can not fall or cut into the root portions of the bolt threads. For that reason less turning effort is required to screw the nut fully onto the bolt.

A still further advantage of my construction is due to the action of serpentine threads in the lip 5, produced by forming the threads in lip 5 while the lip itself was in oblong form (Fig. 2), and then changing the form to that of Fig. 3.

When the nut is being screwed fully onto the bolt until it commences to force the lips 5 outwardly at 8, 8, Fig. 3, the serpentine threads in 5 must come back into the truly helical form of the bolt threads or else the threads in the bolt will have to adapt themselves to the serpentine threads of the nut. If the nut is harder than the bolt the threads of the bolt will deform slightly, and thus adapt themselves to the situation. Hence, when the full capacity of the nut is exerted upon being fully tightened on a work piece, the serpentine threads in the lip portion 5 will require the bolt threads to spring somewhat and thus change their shape. Such change is very slight, but enough to exert desirable nut locking action. The expansion of the nut extension 2 occurs mostly at its outer free end 5 and expansion takes place only to the diameter of the bolt and not that of the nut bore.

Thus it is seen that the bearing or gripping action due to the elliptical shape of the lip 5, Fig. 3, cooperates with the action of the serpentine threads under stress conditions to produce effective and secure nut locking effect; also, that the thinning of lip 5 at 7, 7 enables the device to exert extremely powerful locking actions and yet accomplishes that result with a minimum of effort.

Having thus described my invention, what I claim and desire to secure by Letters Patent is:

1. In a nut comprising a body having an extension projecting from an end thereof, said body and extension provided with a cylindrical bore having an internal thread of full standard height; the end lip portion of the extension comprising a solid wall having an oblong bore and provided with an internal thread; such portions only of said thread as are situated near opposite ends of the short diameter of said lip being truncated and of less than full height; such portions only of the thread as are situated near the opposite ends of the long diameter being of standard cross-sectional form and full height.

2. In a nut comprising a body having an extension projecting from an end thereof, said body and extension provided with a cylindrical bore having an internal thread of full standard height; the end lip portion of the extension comprising a solid wall having an oblong bore and provided with an internal thread; such portions only of said thread as are situated near opposite ends of the short diameter of said lip being truncated; such portions only of the thread as are situated near the opposite ends of the long diameter being of standard cross-sectional form and full height; the solid wall containing the threaded lip portion at the ends of the long diameter being of less thickness than the solid wall at the threaded lip portions adjacent the ends of the short diameter.

RICHARD T. HOSKING.